Dec. 28, 1943.  C. W. MOTT  2,337,763
AGRICULTURAL IMPLEMENT
Filed Jan. 27, 1941  3 Sheets-Sheet 1
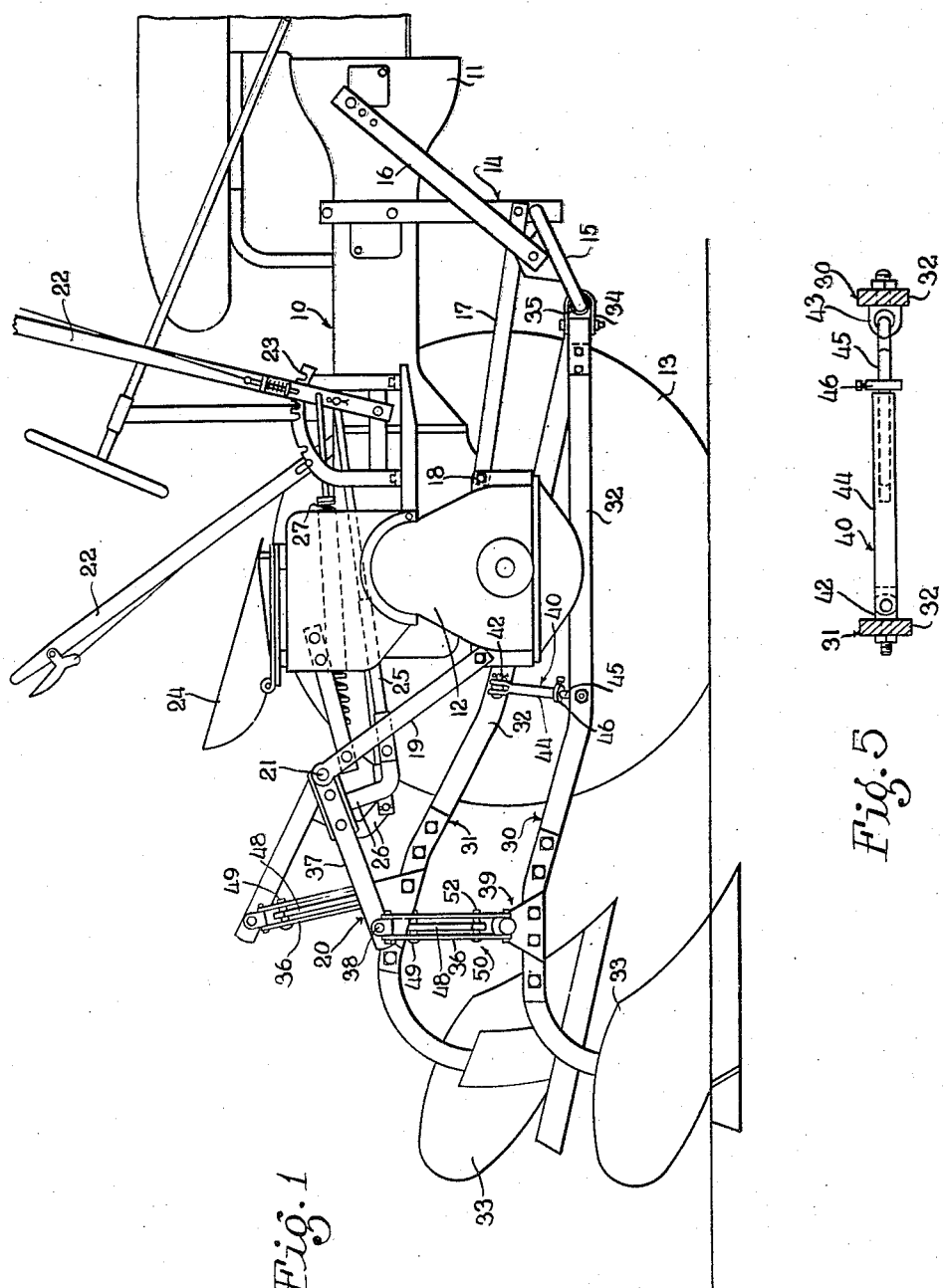
Inventor
Carl W. Mott
By Paul O Pippel
Atty

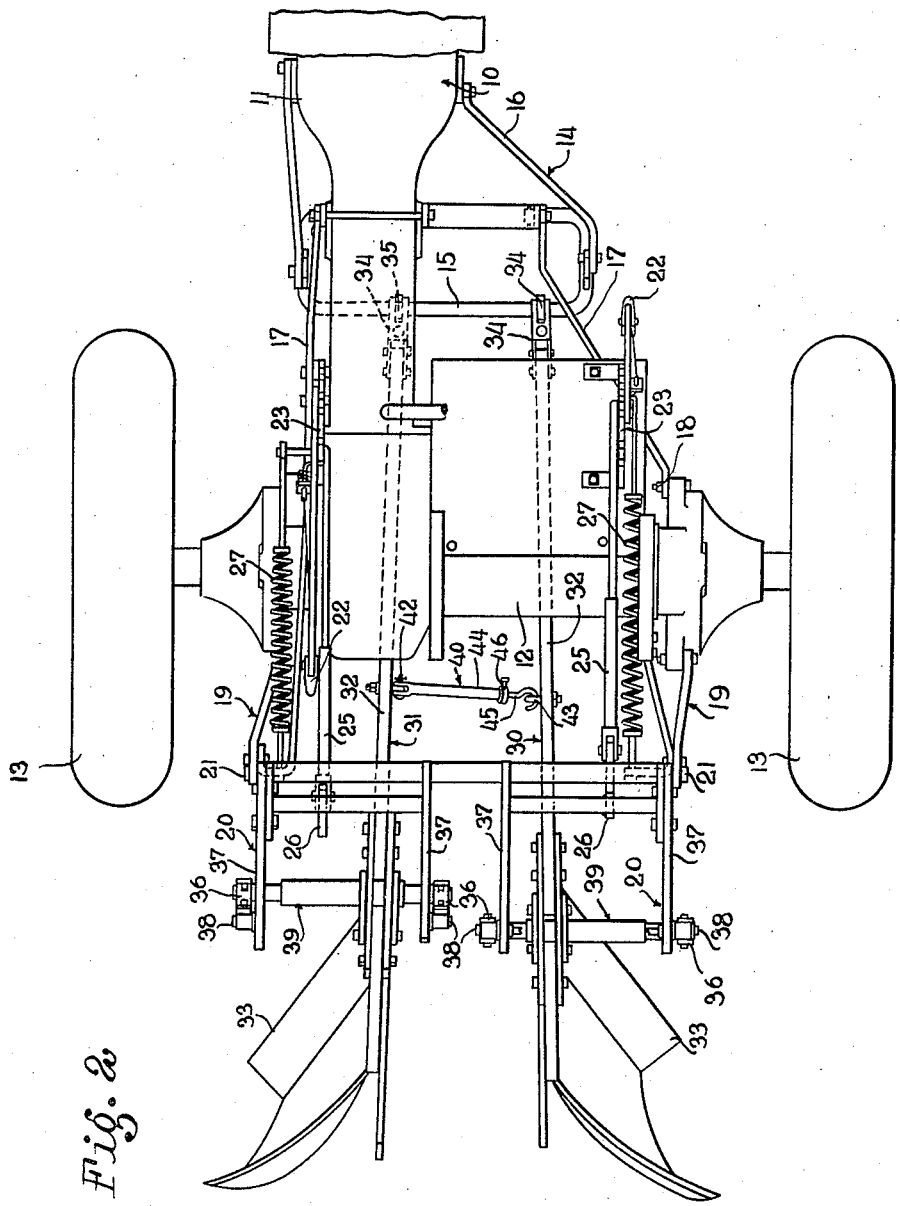

Dec. 28, 1943.  C. W. MOTT  2,337,763
AGRICULTURAL IMPLEMENT
Filed Jan. 27, 1941  3 Sheets-Sheet 3
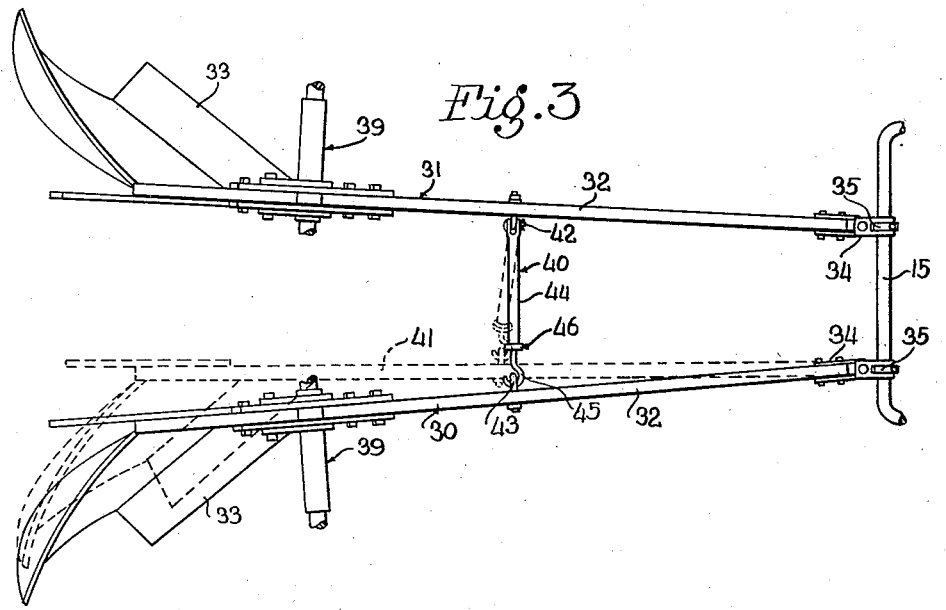
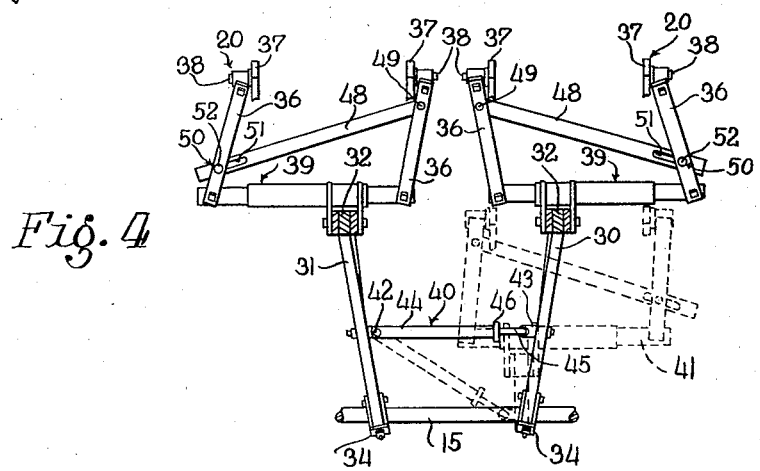
Inventor
Carl W. Mott
By [signature]
Atty.

Patented Dec. 28, 1943

2,337,763

UNITED STATES PATENT OFFICE 2,337,763

AGRICULTURAL IMPLEMENT

Carl W. Mott, La Grange, Ill., assignor to International Harvester Company, a corporation of New Jersey Application January 27, 1941, Serial No. 376,085

6 Claims. (Cl. 97—47)

This invention relates to agricultural implements, and more particularly to implements of the type which are directly connected to a tractor or other supporting means whereby the same can be carried entirely by the tractor for the purpose of being transported.

The invention has further relation to directly-connected two-way plow arrangements wherein but one of two alternate right and left-hand plows is placed in operation at one time. With these plow arrangements, and particularly when used with tractors which are relatively narrow, there is a problem of providing some means for preventing entanglement or locking of the plows with one another. This is particularly true when both plows are being carried in transport position and wherein the plows are of a type adapted to have substantially free lateral movement. It is desirable, therefore, that some means be provided to brace one of the plows with respect to the other. When one of the plows is in its working position there is some problem of maintaining the plow which is then in transport position from interfering with the operation of the plow which is doing the plowing. Therefore, it is also desirable that means be provided to lock the plow which is in transport position to prevent its interfering with the other plow as well as when it is in the plowing position.

It is, therefore, an object of the present invention to provide a simple means for maintaining a pair of working tools or alternate plow structures in spaced relationship at all times in order to prevent entanglement of the same.

It is another object of the invention to provide such means for preventing entanglement of laterally spaced working tools, which is entirely independent of the tractor and may be removed with the implement attachment when the same is disconnected from the tractor.

It is another object of the invention to provide means for positively locking the working tools in their transport position against both inward and outward lateral movement with respect to each other and with respect to the tool-supporting means.

According to the present invention there has been provided means reacting between the two working tools which is adapted for causing the tool being moved from one position to another to be moved laterally automatically upon moving from one vertical position to another vertical position and this same means serving to maintain the working tools in their laterally spaced position. This reacting means takes the form of a telescoping rod arrangement adapted to withstand lateral thrust of the working tool due to its weight and is connected between the tool beams at a location removed from the point of pivotal connection of them to the forward body portion of the tractor. The reacting means can be adjusted to different lengths depending upon the lateral adjustment of the working tools with respect to the tractor and upon the size of the furrow cut during the plowing operation. When it is desired to positively lock the working tools against lateral outward movement, use is made of the usual lateral limiting or stop means associated with each of the working tools. An adjustment is made in the reacting means such that when the working tools are both raised the reacting means will force the same against their respective stop means, thereby positively maintaining the working tools against movement with respect to themselves and with respect to the tractor.

For other objects and for a better understanding of the invention, reference may be had to the following detailed description taken in connection with the accompanying drawings, in which:

Figure 1 is an elevational view of the rear portion of a tractor or tool-supporting means which has connected thereto alternate plowing attachments embodying the features of the present invention;

Figure 2 is a plan view of the same tractor and of the attachment, illustrating particularly the location of the reacting means of the present invention;

Figure 3 is a view of the tool beams, illustrating the relative lateral position of the right-hand tool beam when in its transport and plowing positions;

Figure 4 is an end view of the attachment illustrating the relative positions of the lifting means when one plow is in its transport position or when the other plow is in its plowing position; and Figure 5 is a detail view of the reacting means.

Referring now particularly to Figures 1 and 2, there is shown a tractor or tool-supporting means 10 having a forward body portion 11 and a rear axle structure 12 supported by the rear drive wheels 13. Connected to the forwardly extending body portion is a depending bracket structure indicated generally at 14 having a rearwardly extending bail 15 which may be located in any vertical position depending upon the adjustment of the strap 16 with the forwardly extending body portion 11. The depending structure 14 is supported against rearward movement by the forwardly extending bracing members 17 connected at their rear ends to the rear axle structure, as indicated at 18.

Connected on the rear of the rear axle structure 12 is a rearwardly overhanging supporting structure indicated generally at 19 and adapted to pivotally support a pair of raising and lowering arrangements or means 20 on their rearward end as indicated at 21. Each of these raising and lowering means 21 may be caused to rotate about a pivotal connection by a manual lever 22 working over a quadrant 23, both of which are mounted on the tractor at a location forwardly of the rear axle structure and near to an operator's station 24. Each lever 22 is connected by means of a link 25 to an arm member 26 rigid with the raising and lowering means 20. As the lever 22 is pulled rearwardly by the operator, the lifting means 20 will be rotated in a clockwise direction about its pivotal connection 21. As the lever is released and returns forwardly, the lifting means 20 will rotate about its pivotal connection 21 in a counter-clockwise direction. To assist in the rearward movement of the lever to effect a raising or clockwise movement of the lifting means, there is provided a helper spring 27.

Pivotally connected to the bail 15 are a pair of alternate plow structures indicated generally at 30 and 31. Each plow structure includes a tool beam 32 and a working tool or plow bottom 33. The plow bottom, located on the right-hand side of the tractor when in its ground-working position, will throw the dirt opposite to the plow bottom located on the opposite side of the tractor. The connection of the respective plow structure to be presently described will apply equally for both of the plow structures.

The tool beam 32 is connected to the transversely extending portion of the bail 15 by means of a swivel link 34 and is retained in its laterally adjusted position on the bail by means of a set collar 35. This swivel link connection permits lateral pivotal movement of the beam 32 as well as vertical pivotal movement of the same.

The rear ends of the plow beams 32 are respectively connected to the right-hand and left-hand lifting means 20. The lifting means 20 also include two spaced downwardly extending link structures 36 which are connected at their upper ends to rearwardly extending arms 37, forming a part of the lifting means 20 for lateral and for fore and aft swinging movement as indicated at 38. The lower ends of the link structures 36 are similarly connected to the beams 32 by means of a transversely extending structure 39 rigid with the beam 32. It should now be apparent that each of the alternate right-hand and left-hand plow structures are connected to the tractor for both lateral and vertical movement with respect thereto. It should also now be apparent that there has been provided a separate lifting means for each of the respective right-hand and left-hand plow structures.

Referring now particularly to the Figures 3 and 4, there is illustrated more particularly the main feature of the present invention. As shown in Figure 3, it will be noted that, when both of the plow structures are in their transport position, they will be definitely held in diverging relationship, forwardly and toward the rear of the tractor, by a reacting means 40 interconnected between the beams of the respective plow structures. This reacting means serves as a brace to always maintain the plow structures when in both their transport and plowing positions, in laterally spaced relationship with respect to each other in order to avoid entanglement of the same as they are being transported or when in plowing position as might readily occur with plow structures connected to tractors for relatively free lateral movement. As the right-hand plow bottom is lowered to its plowing position, shown in dotted lines at 41 in Figures 3 and 4, it will be noted that the right-hand plow structure will tend to aline itself with the hitch connection on the bail 15, the reacting means 40 will merely be caused to rotate about its pivotal connection 42 with the left-hand structure 31 and will still be effective for the purpose of maintaining the plow structure 31 laterally spaced from the plow structure 30. The plow structure 31 will remain substantially in its regular transport position and diverging from a center line between the two plow structures in amount similar to that which the diverged plow structures were being held in their transport position. The plow structure 31 is held in this position by the reacting means 40.

Since there is also a tendency for a plow bottom to move inwardly to take a larger cut than is ordinarily desired, the thrust upon the same due to the weight of the plow structure, reacting through the reacting means 40, will tend to eliminate this tendency for the plow bottom to cut further in the ground.

As the plow structure 30 is moved from its plowing position to a transport position, the same will be caused to move laterally outwardly and away from the plow structure 31 by the reacting means 40, the plow structure 30 thereby reacting against the plow structure 31. Thus, it should be apparent that the plow structure 31 serves not only for permitting inward lateral movement of the plow structure 30 but also causes lateral outward movement of the plow structure 30.

Referring now particularly to Figure 4, there is shown a vertical view of the plow beams as viewed from the rear of the tractor showing the relative position of the parts of the lifting means when both plow structures are raised and showing in dotted lines the position of the parts of one of the lifting means when the plow structure 30 is lowered into plowing position. It will be noted that the reacting means 40 will be inclined downwardly to the right and will thereby support the weight of the plow structure 31. While illustrations have been made showing only the right-hand plow structure in its ground-working position, it will be apparent that there may be a reversal of the arrangement with the left-hand plow structure lowered to the plowing position.

Referring now to Figure 5, there is shown in detail the structure of the reacting means 40, its connection 42 with the left-hand member or plow structure 31, and its connection 43 with the right-hand plow structure 30. The reacting means itself includes a pair of telescoping parts 44 and 45 and a set collar 46 for holding the telescoping parts in their adjusted position. The parts may be either extended or collapsed as desired depending upon the amount of divergence of the plow structures 30 and 31 that is desired in their transport position or when one is in transport and the other is in its plowing position. It will also be apparent that an adjustment may be made of the telescoping parts 44 and 45 for different settings of the plow structures on the bail 15 depending upon the width of cut and also depending on the type or width of the plow bottoms 33 being used.

Referring now particularly to Figure 4, it will be noted that there has been provided with each of the raising and lowering means 20, a laterally extending limiting or stop means 48 diagonally arranged between the link structures 36. With one of the link structures this diagonal means 48 is merely pivotally connected, as indicated at 49, while with the other link structure it has a lost-motion connection as indicated at 50. This lost-motion connection includes a slot 51 through which extends a pin 52 rigid on the link structure 36. This slot 51 is of such length as to normally permit a limited amount of lateral movement of the plow structure when the plow structure is in its ground position but is still only of sufficient length as to have its end wall engaged with the pin 52 to prevent further lateral outward movement.

It should be apparent that, when the reacting means 40 is adjusted so that when both of the working tools have been raised to their transport position, the respective pins 52 will have been moved into engagement with the ends of the slot 51. When this has taken place the working tools will be held against further lateral outward movement and against inward movement with respect to each other, whereby the tools will be positively locked with respect to each other and with respect to the tractor.

It should now be apparent that a means has been provided for maintaining laterally spaced plow structures which are respectively connected to a tractor for independent lateral movement, which is of a simple construction and which is arranged to be removable from the tractor with the implement attachment.

While various changes may be made in the detail construction, it shall be understood that such changes shall be within the spirit and scope of the present invention as defined in the appended claims.

What is claimed is:

1. In combination, a tractor, right-hand and left-hand plow structures respectively connected to the tractor for alternate operation, each of the plow structures having both lateral movement and vertical movement between a lowered plowing position and a raised transport position, means on the tractor for respectively vertically moving the plows and including laterally movable carriage means respectively for said plow structures to permit said lateral movement thereof, each of said plow structures assuming an inwardly disposed position when in its respective plowing position, and a thrust structure pivotally connected to and between said plow structures to maintain the same transversely separated while they are in the transport position and to react against either thereof in the transport position for exerting a lateral force component upon the other in the plowing position to resist further inward movement of said other in the plowing position.

2. In combination, tool-supporting means, working tools located in transversely spaced relationship with respect to each other, separate means for connecting the respective working tools to the tool-supporting means for independent vertical and lateral movement, means for raising and lowering the working tools, stop means associated with each of the connecting means for limiting lateral outward movement, and thrust means carried by and reacting between the working tools for maintaining the working tools laterally separated, said thrust means being connected to said tools at respective points that are raised and lowered therewith so said thrust means is tilted to change the lateral spacing of said points and hence of the tools upon change in the relative elevation of said tools, and the center-line distance between said points being such that when the tools are at substantially the same elevation in transport the lateral distance between said points is great enough to cause the outward projection of each tool against its respective stop means to lock the tools against lateral movement.

3. In combination, a tractor, right-hand and left-hand plow structures connected to the tractor for alternate operation, each of the plow structures being connected to the tractor for vertical movement from their lowered plowing position to a raised transport position and also being capable of lateral movement, the transport position of each plow structure being laterally outward with respect to its plowing position, means for raising the respective plow structures from their plowing position to their transport position, thrust-exerting means carried by and extending between the plow structures for maintaining the plow structure in the transport position laterally removed from the plow structure in its plowing position, and said thrust-exerting means by its reaction against the raised plow structure in transport serving to shift the lowered plow structure laterally outwardly into its transport position upon the same being raised.

4. In combination, a tractor, right-hand and left-hand plow structures located in transversely spaced relationship with respect to each other for alternate operation, separate support means upon the tractor for the respective plow structures and operable to impart independent vertical movement to said plow structures while allowing lateral movement thereof, stop means associated with each of the plow structures to limit their lateral outward movement, means for operating said support means for raising and lowering the plow structures, and generally rigid thrust means extending and reacting between said plow structures to space the same laterally apart a distance constituting a direct function of their approach to the same elevation, and the extent of said thrust means transversely of the plow structures being sufficient to laterally space said plow structures far enough when they are both in the raised transport position that they are projected outwardly against their respective stop means, whereby the plow structures will be positively locked against lateral movement with respect to the tractor.

5. In a vehicular plowing implement, a frame, right-hand and left-hand plow structures having forward portions connected to said frame and extending backwardly with respect thereto, the connection of each plow structure facilitating vertical movement of rear portions thereof between a raised transport position and a lowered plowing position and also facilitating lateral movement of such rear portions of said structures, means for independently raising and lowering said plow structure rear portions, thrust means carried between said rear portions for occupying a generally perpendicular relation therebetween when they are in the transport position and being of sufficient length to thereby maintain said plow structures in a backwardly diverging arrangement, but said thrust means changing to an inclined position between said plow structures pursuant to the lowering of either while the other remains in transport and to thereby facilitate lateral inward movement of the lowered plow structure into a position of substantial parallelism with the line of travel of said vehicle, each of said plow structures also being reactable upon by the earth while in the plowing position to be urged inwardly beyond such parallelism, and said inclined thrust means then being reactive upwardly and outwardly against the plow structure in transport to oppose said reactive force of the earth.

6. In a vehicular plowing implement, a frame, right-hand and left-hand plow-supporting means upon and spaced transversely of the frame, right-hand and left-hand plow structures respectively on said supporting means and tending to occupy respective intermediate positions transversely of the frame, said plow-supporting means being transversely movable in opposite directions to move the plowing structures either inwardly or outwardly from their intermediate positions and also being operable to raise and lower said plowing structures, means for independently so operating the plow-supporting means whereby the plow structures can be separately lowered into a plowing position or both raised into a transport position, generally rigid thrust means extending and reacting between the plow structures to urge both outwardly, said thrust means being of sufficient length to force each of the plowing structures outwardly from its said intermediate position when they are at substantially the same elevation in their transport positions, and stop means respectively associated with said plow structures to prevent further outward movement thereof while in the transport position and to thus cooperate with said thrust means in trammeling side sway of the plow structures.

CARL W. MOTT.